2,972,456
Patented Feb. 21, 1961

2,972,456
GUIDED MISSILES

Richard Sutton Ransom, Holywood, and Henry Wilfred Finnigan, Belfast, Northern Ireland, assignors to Short Brothers and Harland Limited, Belfast, Northern Ireland Filed Feb. 17, 1959, Ser. No. 793,838

Claims priority, application Great Britain Feb. 25, 1958

4 Claims. (Cl. 244—14)

The invention has reference to missiles of the type wherein control in flight is effected through the angular adjustment of wing-like organs by fluid-pressure motors which are selectively actuated by suitable control apparatus, and the object of the invention is to provide means for locking the said organs in a neutral position except when pressurised liquid is available for said motors.

According to the invention there is provided an axially-slidable sleeve, which incorporates locking abutments and a slide valve controlling the flow of fluid to the actuating motors. In the closed or locked position the said sleeve is arranged to engage means associated with each control organ so as thereby to prevent the angular adjustment thereof. At one end the said sleeve is exposed to the hydraulic fluid supply for the actuating motors, so that, when such supply is pressurised the sleeve is caused to be slidably retracted from engagement with the control organs, leaving them free for adjustment as required, at the same time uncovering the pressure supply ports to the actuating motors.

Figures 1, 2:
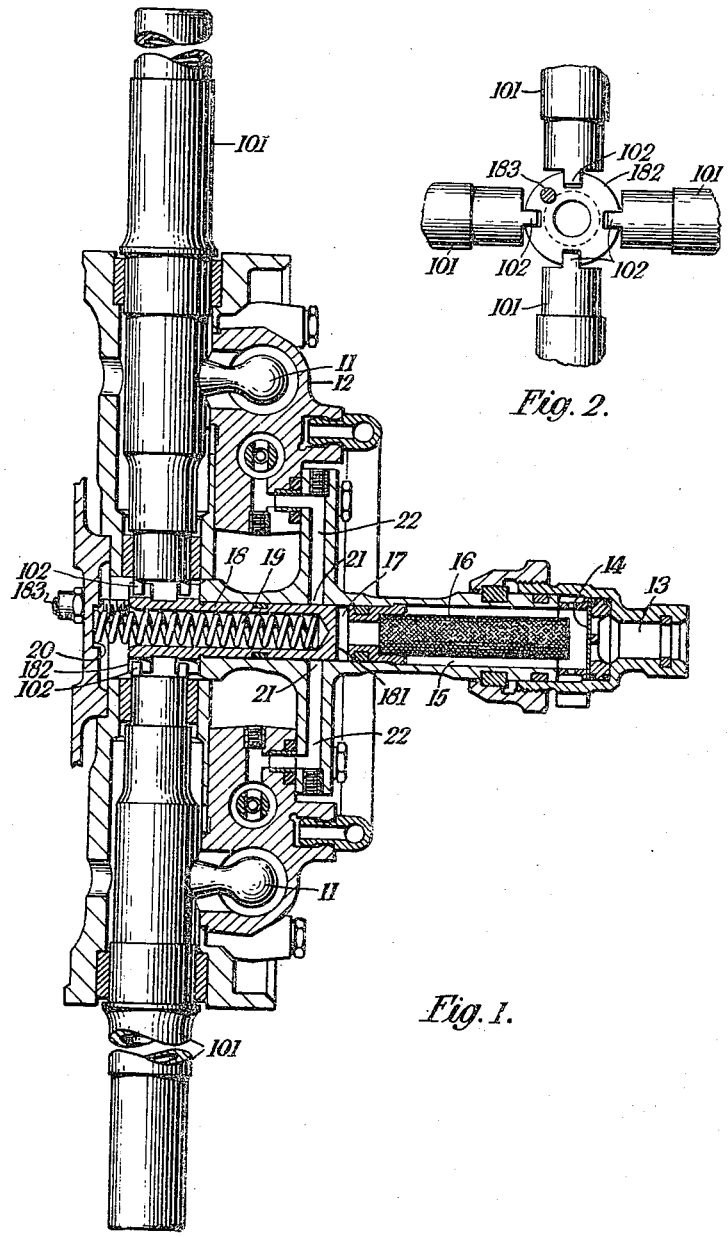
Figure 3:
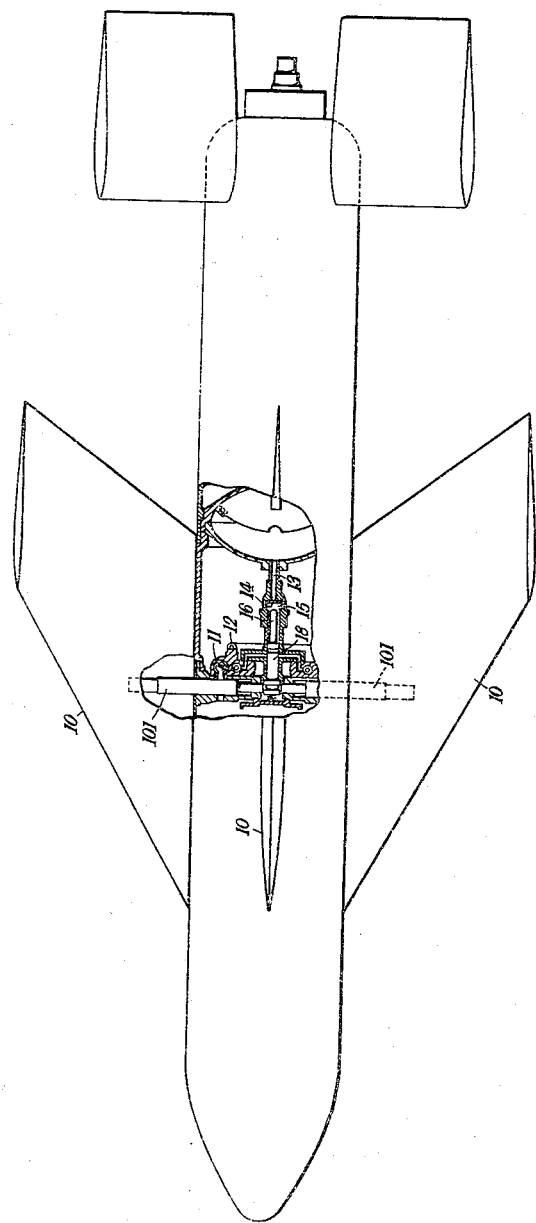

The manner in which the invention is carried into effect is hereinafter described with reference to the accompanying drawing, in which Fig. 1 represents a transverse section of the operating mechanism for the control organs of a missile of the aforementioned type, Fig. 2 being a detail of the end of the locking sleeve. Fig. 3 is a general view of the missile.

The missile is controlled in flight by two pairs of wing-like organs 10 mounted on four tubular stub shafts 101 which are disposed equiangularly about the longitudinal axis indicated by the line x—y, only two of such stub shafts 101 being shown in Fig. 1. One pair of said organs 10 is used for control in pitch and roll, and the other pair for control in yaw. Each shaft 101 is rotated about its own longitudinal axis, which is perpendicular to the line x—y, by a torque arm 11 by a reciprocatory hydraulic motor contained in the housing 12. (The constructional arrangement of such motor is described in the co-pending British patent application No. 6053/1958.) Pressurised hydraulic fluid for operating the several motors 12 is supplied at 13 where its passage is obstructed by a burster disc 14 which is adapted to rupture when the pressure of the fluid attains the requisite value for effective operation of said motors.

After passing the disc 14, the fluid enters the chamber 15, passes through the filter 16 and enters the chamber 17 where it is confronted by the end-face 181 of the sleeve 18 which is slidable axially in said chamber 17. Said sleeve 18 is subjected to the action of a compression spring 19 which is housed inside the sleeve and is arranged to bear against the inner face of the fixed member 20, so that except when its face 181 is subjected to the pressure of the hydraulic fluid as aforesaid, the sleeve 18 is maintained by the spring in the position illustrated. In this position a slotted flange 182 provided on the left-hand end of the sleeve as viewed in Fig. 1, engages with dogs 102 which are provided on the inner end of each stub-shaft 101, thereby holding said shafts 101, together with the control organs 10 carried thereby, against displacement.

When the missile is in flight, and control movements require to be transmitted to the valve-governed motors by which the stub-shafts 101 are operated, the pressure of the fluid against the face 181 of the sleeve 18 suffices to overcome the force exerted by the spring 20, and also incidental torque loads from the stub-shaft 101, causing the sleeve to be slidden axially in the chamber 17 until the ports 21 are exposed. Fluid under pressure may then enter the ducts 22 and pass uninterrupted to the motors for the operation of the flight control organs as determined by automatic relay apparatus (not shown) by which the motor valves are selectively actuated.

To facilitate testing of the motors and connected mechanism, the sleeve 18 is conveniently provided with a bolt 183 which projects through the member 20 and which may be withdrawn manually to disengage the slotted flanges 182 from the stub-shaft dogs 102.

What we claim as our invention and desire to secure by Letters Patent is:

1. A missile including flight control organs, fluid-pressure motors connected to said organs to impart control movements thereto, means for supplying hydraulic fluid to said motors, a duct between said supplying means and said motors, and means in said duct which, except when subjected to the operating pressure of said fluid, are effective to lock the flight control organs in a neutral position, said locking means comprising a member mounted in said duct, a detent on said member adapted to engage and lock an abutment associated with each flight control organ when the latter is in neutral position, said member having an end-face which supports the fluid pressure in the duct, and a spring tending to hold said member in a locked position, the member being slidable against said spring when said pressure reaches full operating value, to unlock said abutment and free said flight control organs.

2. A missile as claimed in claim 1, wherein the flight control organs are supported on stubs disposed normally to the longitudinal axis of the missile, said stubs being rotatable for adjustment of said organs and wherein the slidable member is a sleeve operating in a chamber aligned on said axis, said sleeve having a notched flange and the control organ stubs having terminal dogs arranged to be engaged and locked by the notches in the sleeve flange when in the neutral position, except when the sleeve is subjected to fluid pressure in said chamber.

3. A missile as claimed in claim 2, comprising means for manual extraction of the sleeve.

4. A missile as claimed in claim 1, wherein the slidable member is arranged in the inoperative position to cover ports which, when the member moves axially under action of fluid pressure in the supply duct, provide access for said fluid to motors for operating the control organs.

References Cited in the file of this patent

UNITED STATES PATENTS

| 2,664,255 | Crandall | Dec. 29, 1953 |
| 2,855,900 | Elmer | Oct. 14, 1958 |